US012529176B2

(12) United States Patent
Reger et al.

(10) Patent No.: US 12,529,176 B2
(45) Date of Patent: Jan. 20, 2026

(54) PRESSURE SENSING ASSEMBLY FOR A WASHING MACHINE APPLIANCE

(71) Applicant: Haier US Appliance Solutions, Inc., Wilmington, DE (US)

(72) Inventors: Todd Anthony Reger, Crestwood, KY (US); Erick Flores Islas, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 42 days.

(21) Appl. No.: 18/584,527

(22) Filed: Feb. 22, 2024

(65) Prior Publication Data

US 2025/0270749 A1 Aug. 28, 2025

(51) Int. Cl.

| | |
|---|---|
| ***D06F 34/14*** | (2020.01) |
| ***D06F 23/02*** | (2006.01) |
| ***D06F 37/26*** | (2006.01) |
| ***G01F 23/18*** | (2006.01) |
| *D06F 103/18* | (2020.01) |
| *D06F 103/30* | (2020.01) |

(52) U.S. Cl.

CPC .............. *D06F 34/14* (2020.02); *D06F 23/02* (2013.01); *D06F 37/267* (2013.01); *G01F 23/18* (2013.01); *D06F 2103/18* (2020.02); *D06F 2103/30* (2020.02)

(58) Field of Classification Search

CPC ........ D06F 34/14; D06F 23/02; D06F 37/267; D06F 2103/18; D06F 2103/30; G01F 23/18

USPC ........................................................ 68/12.05

See application file for complete search history.

(56) References Cited

U.S. PATENT DOCUMENTS

| | | | | |
|---|---|---|---|---|
| 6,481,246 | B1 | 11/2002 | Johnson et al. | |
| 11,293,132 | B2 | 4/2022 | Kim et al. | |
| 2015/0007617 | A1* | 1/2015 | Mantle | D06F 39/04 68/140 |
| 2022/0010477 | A1* | 1/2022 | Perosa | D06F 39/088 |
| 2022/0018052 | A1* | 1/2022 | Scheckelhoff | D06F 39/087 |

FOREIGN PATENT DOCUMENTS

| | | | | |
|---|---|---|---|---|
| EP | 2746450 A1 * | 6/2014 | | D06F 39/083 |
| GB | 2454092 A * | 4/2009 | | D06F 34/18 |
| JP | 5836550 B2 | 12/2015 | | |

* cited by examiner

*Primary Examiner* — Tinsae B Ayalew

(74) *Attorney, Agent, or Firm* — Dority & Manning, P.A.

(57) ABSTRACT

A washing machine appliance includes a wash tub positioned within a cabinet and defining a wash chamber and a sump, a wash basket rotatably mounted within the wash tub for receiving a load of clothes, a dispensing assembly mounted within the cabinet for selectively adding wash fluid into the wash tub, and a pressure sensing assembly in fluid communication with a sump of the wash tub. The pressure sensing assembly comprises a sensor housing mounted to the wash tub, the sensor housing defining a fluid inlet in fluid communication with the sump, an air chamber in fluid communication with the fluid inlet, and a sensing chamber in fluid communication with the air chamber, and a pressure sensor mounted within the sensing chamber for detecting an air pressure of the air chamber.

20 Claims, 6 Drawing Sheets

PRESSURE SENSING ASSEMBLY FOR A WASHING MACHINE APPLIANCE

FIELD OF THE INVENTION

The present subject matter relates generally to washing machine appliances, or more specifically, to a pressure sensing assembly of a washing machine appliance.

BACKGROUND OF THE INVENTION

Washing machine appliances generally include a tub for containing water or wash fluid, e.g., water and detergent, bleach, and/or other wash additives. A basket is rotatably mounted within the tub and defines a wash chamber for receipt of articles for washing. During normal operation of such washing machine appliances, the wash fluid is directed into the tub and onto articles within the wash chamber of the basket. The basket or an agitation element can rotate at various speeds to agitate articles within the wash chamber, to wring wash fluid from articles within the wash chamber, etc. During a spin or drain cycle, a drain pump assembly may operate to discharge water from within sump.

Certain conventional washing machine appliances include pressure sensors to help determine the amount of water in a washing machine. For example, conventional systems include an air chamber that is mounted to the rear portion of the washing machine tub and a pressure sensor is mounted to a circuit board mounted in a controller housing located behind the user interface panel. A hose is used to fluidly couple the pressure at the air chamber to the pressure sensor. These hoses are typically very long, e.g., 18-30 inches in length. In addition, such a system requires many clips, screws, and routing features on other components to ensure that the hose is routed properly and does not kink or contact other components during operation, resulting in undesirable noise and/or pressure fluctuations.

Accordingly, a washing machine appliance having features for facilitating improved water level detection would be desirable. More specifically, a system for measuring water pressure that includes minimal components, provides accurate sensing, and requires simple assembly would be particularly beneficial.

BRIEF DESCRIPTION OF THE INVENTION

Aspects and advantages of the invention will be set forth in part in the following description, or may be apparent from the description, or may be learned through practice of the invention.

In one exemplary embodiment, a washing machine appliance is provided including a wash tub positioned within a cabinet and defining a wash chamber and a sump, a wash basket rotatably mounted within the wash tub for receiving a load of clothes, a dispensing assembly mounted within the cabinet for selectively adding wash fluid into the wash tub, and a pressure sensing assembly in fluid communication with a sump of the wash tub. The pressure sensing assembly includes a sensor housing mounted to the wash tub, the sensor housing defining a fluid inlet in fluid communication with the sump, an air chamber in fluid communication with the fluid inlet, and a sensing chamber in fluid communication with the air chamber and a pressure sensor mounted within the sensing chamber for detecting an air pressure of the air chamber.

In another exemplary embodiment, a pressure sensing assembly for a washing machine appliance is provided. The washing machine appliance includes a wash tub defining a sump. The pressure sensing assembly includes a sensor housing mounted to the wash tub, the sensor housing defining a fluid inlet in fluid communication with the sump, an air chamber in fluid communication with the fluid inlet, and a sensing chamber in fluid communication with the air chamber and a pressure sensor mounted within the sensing chamber for detecting an air pressure of the air chamber.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

Figure 1:
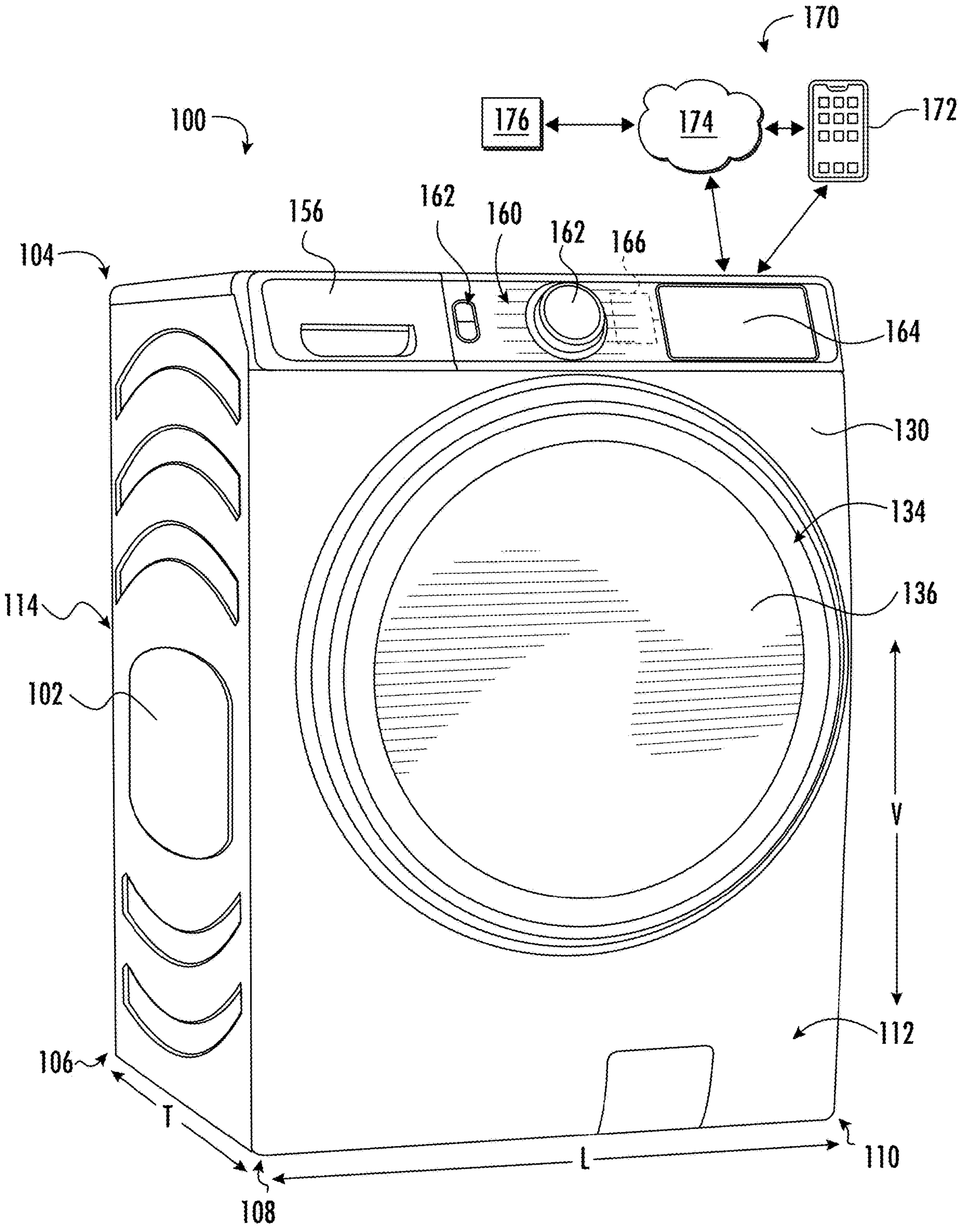
FIG. 1 provides a perspective view of a washing machine appliance according to an example embodiment of the present subject matter.

Repeat use of reference characters in the present specification and drawings is intended to represent the same or analogous features or elements of the present invention.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms “includes” and “including” are intended to be inclusive in a manner similar to the term “comprising.” Similarly, the term “or” is generally intended to be inclusive (i.e., “A or B” is intended to mean “A or B or both”). Approximating language, as used herein throughout the specification and claims, is applied to modify any quantitative representation that could permissibly vary without resulting in a change in the basic function to which it is related. Accordingly, a value modified by a term or terms, such as “about,” “approximately,” and “substantially,” are not to be limited to the precise value specified. In at least some instances, the approximating language may correspond to the precision of an instrument for measuring the value. For example, the approximating language may refer to being within a 10 percent margin.

Figure 2:
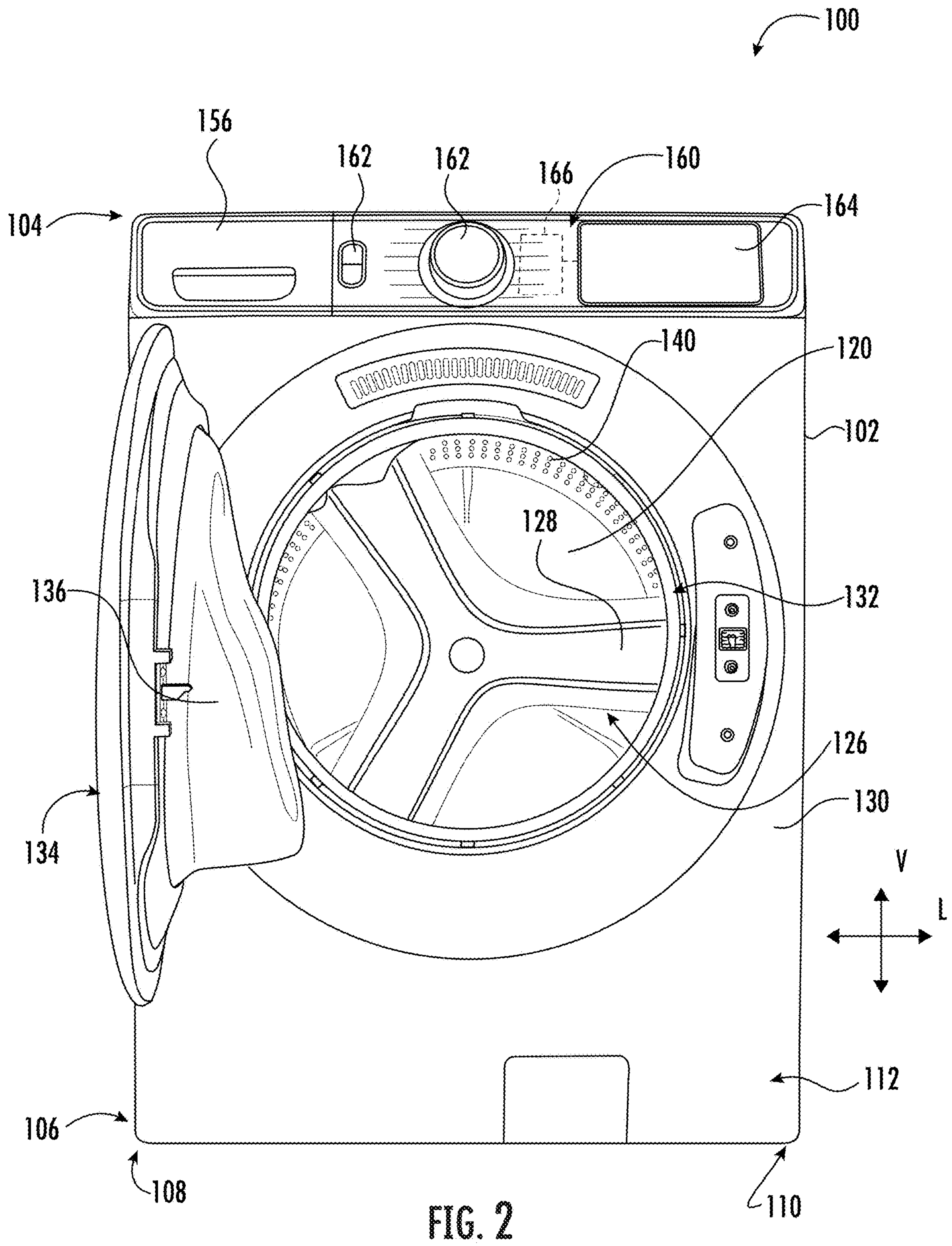
FIG. 2 provides a front view of the example washing machine appliance of FIG. 1 with a door in the open position according to an example embodiment of the present subject matter.
Figure 3:
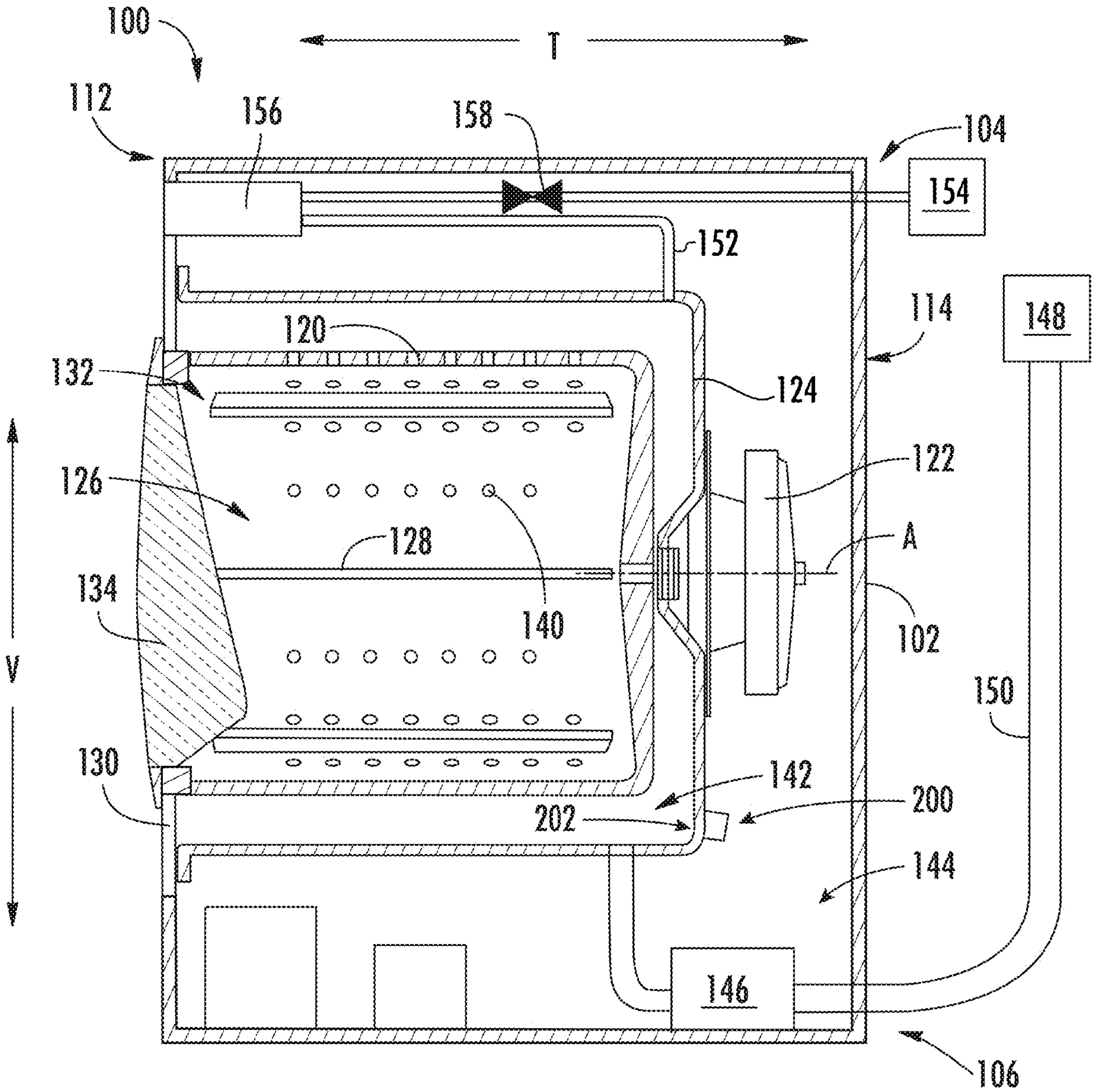
FIG. 3 provides a side cross-sectional view of the example washing machine appliance of FIG. 1 according to an example embodiment of the present subject matter.
Figure 4:
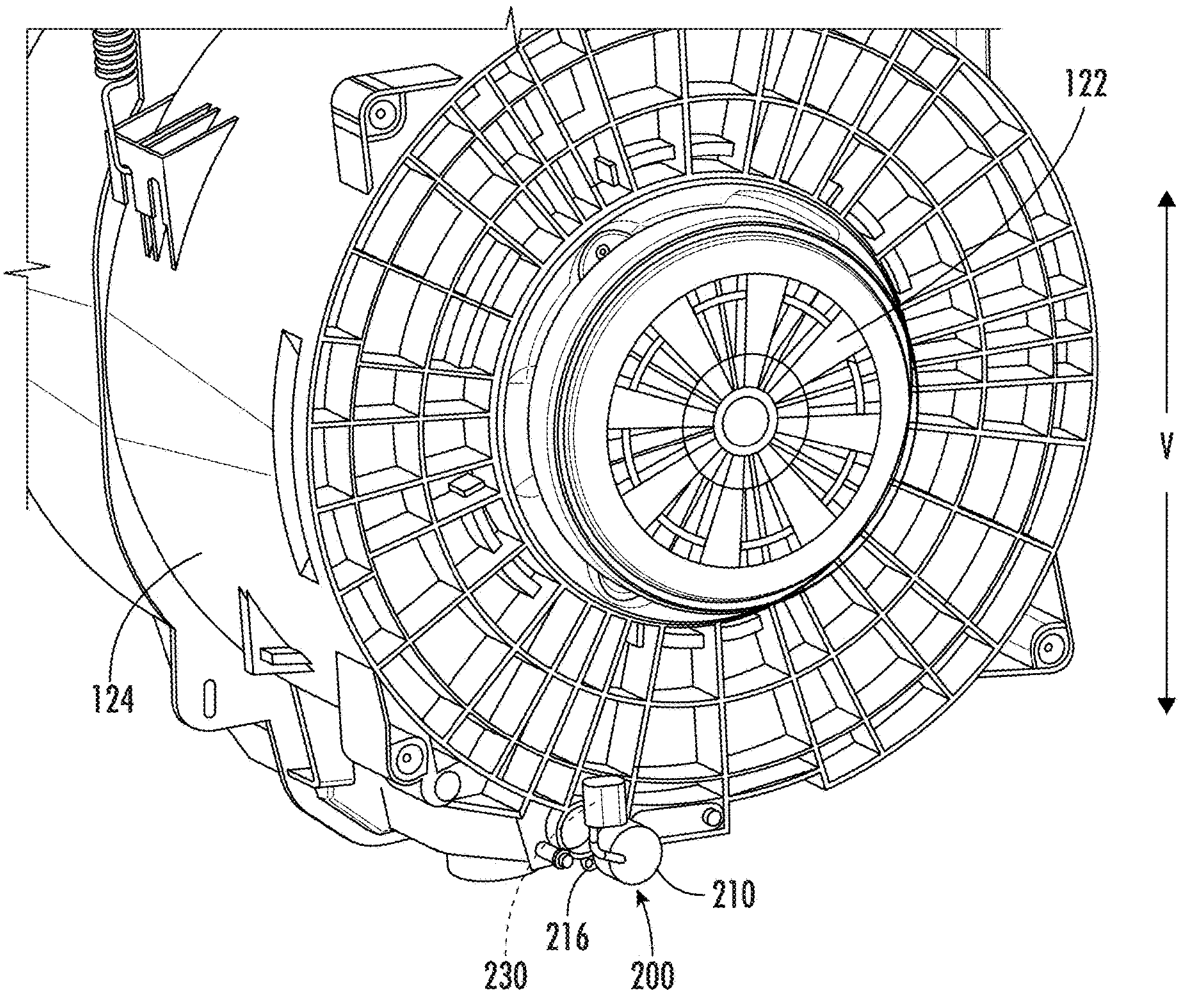
FIG. 4 provides a rear, perspective view of a wash tub and pressure sensing assembly of the example washing machine appliance of FIG. 1 according to an example embodiment of the present subject matter.
Figure 5:
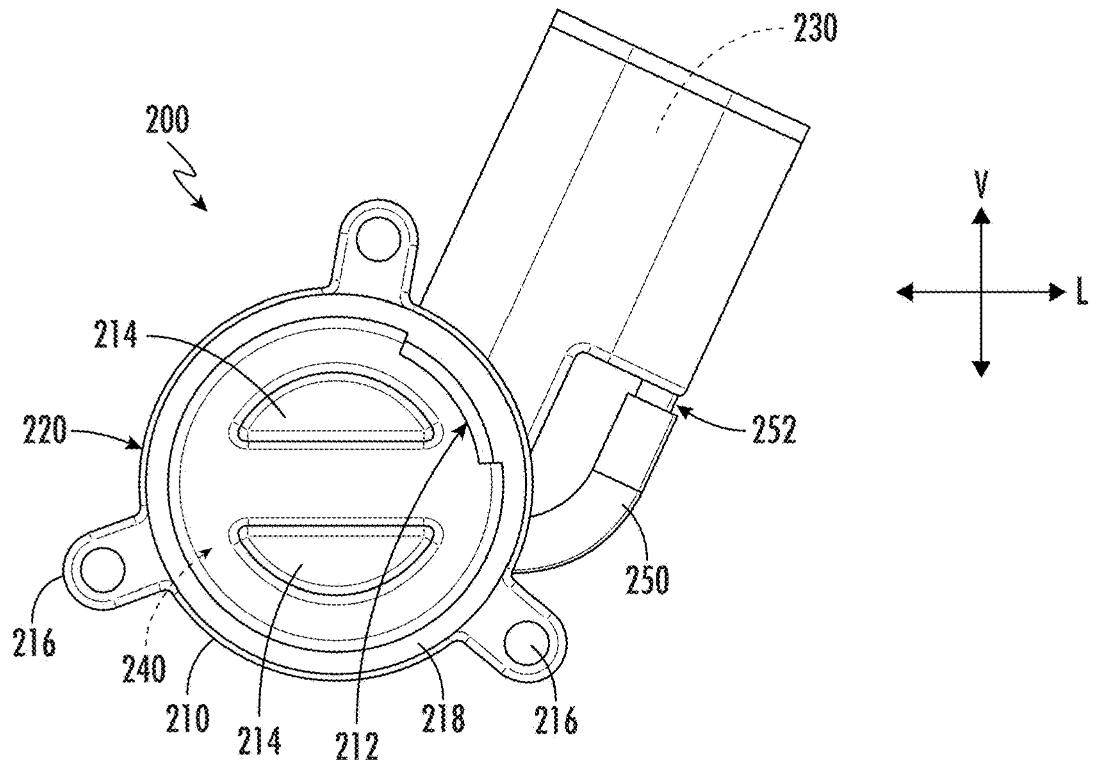
FIG. 5 provides a perspective view of the example pressure sensing assembly of FIG. 4 according to an example embodiment of the present subject matter.
Figure 6:
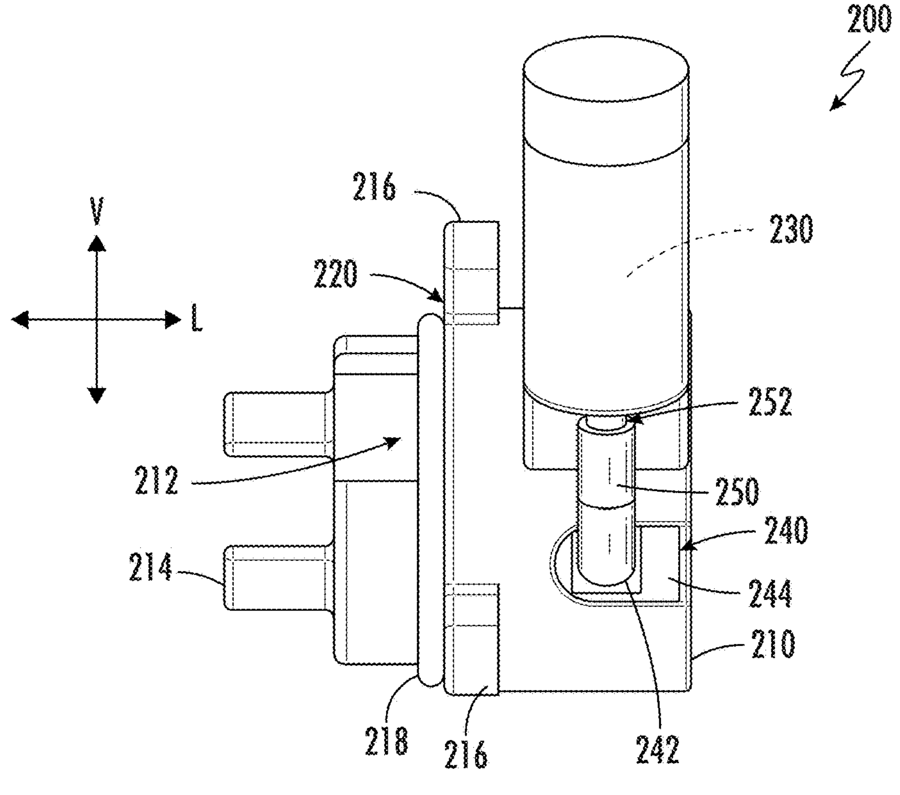
FIG. 6 provides a side view of the example pressure sensing assembly of FIG. 4 according to an example embodiment of the present subject matter.

Referring now to the figures, FIG. 1 is a perspective view of an exemplary horizontal axis washing machine appliance 100, FIG. 2 is a front view of washing machine appliance 100, and FIG. 3 is a side cross-sectional view of washing machine appliance 100. As illustrated, washing machine appliance 100 generally defines a vertical direction V, a lateral direction L, and a transverse direction T, each of which is mutually perpendicular, such that an orthogonal coordinate system is generally defined. Washing machine appliance 100 includes a cabinet 102 that extends between a top 104 and a bottom 106 along the vertical direction V, between a left side 108 and a right side 110 along the lateral direction, and between a front 112 and a rear 114 along the transverse direction T.

Referring to FIGS. 2 and 3, a wash basket 120 is rotatably mounted within cabinet 102 such that it is rotatable about an axis of rotation A. A motor 122, e.g., such as a pancake motor, is in mechanical communication with wash basket 120 to selectively rotate wash basket 120 (e.g., during an agitation or a rinse cycle of washing machine appliance 100). Wash basket 120 is received within a wash tub 124 and defines a wash chamber 126 that is configured for receipt of articles for washing. The wash tub 124 holds wash and rinse fluids for agitation in wash basket 120 within wash tub 124. As used herein, “wash fluid” may refer to water, detergent, fabric softener, bleach, or any other suitable wash additive or combination thereof. Indeed, for simplicity of discussion, these terms may all be used interchangeably herein without limiting the present subject matter to any particular “wash fluid.”

Wash basket 120 may define one or more agitator features that extend into wash chamber 126 to assist in agitation and cleaning articles disposed within wash chamber 126 during operation of washing machine appliance 100. For example, as illustrated in FIG. 3, a plurality of ribs 128 extends from basket 120 into wash chamber 126. In this manner, for example, ribs 128 may lift articles disposed in wash basket 120 during rotation of wash basket 120.

Referring generally to FIGS. 1 through 3, cabinet 102 also includes a front panel 130 which defines a chamber opening 132 that permits user access to wash basket 120 of wash tub 124. More specifically, washing machine appliance 100 includes a door 134 that is positioned over chamber opening 132 and is rotatably mounted to front panel 130. In this manner, door 134 permits selective access to chamber opening 132 by being movable between an open position (FIG. 2) facilitating access to a wash tub 124 and a closed position (FIG. 1) prohibiting access to wash tub 124.

A window 136 in door 134 permits viewing of wash basket 120 when door 134 is in the closed position, e.g., during operation of washing machine appliance 100. Door 134 also includes a handle (not labeled) that, e.g., a user may pull when opening and closing door 134. Further, although door 134 is illustrated as mounted to front panel 130, it should be appreciated that door 134 may be mounted to another side of cabinet 102 or any other suitable support according to alternative embodiments.

Referring again to FIG. 3, wash basket 120 also defines a plurality of perforations 140 in order to facilitate fluid communication between an interior of basket 120 and wash tub 124. A sump 142 is defined by wash tub 124 at a bottom of wash tub 124 along the vertical direction V. Thus, sump 142 is configured for receipt of and generally collects wash fluid during operation of washing machine appliance 100. For example, during operation of washing machine appliance 100, wash fluid may be urged by gravity from basket 120 to sump 142 through plurality of perforations 140.

A drain pump assembly 144 is located beneath wash tub 124 and is in fluid communication with sump 142 for periodically discharging soiled wash fluid from washing machine appliance 100. Drain pump assembly 144 may generally include a drain pump 146 which is in fluid communication with sump 142 and with an external drain 148 through a drain hose 150. During a drain cycle, drain pump 146 urges a flow of wash fluid from sump 142, through drain hose 150, and to external drain 148. More specifically, drain pump 146 includes a motor (not shown) which is energized during a drain cycle such that drain pump 146 draws wash fluid from sump 142 and urges it through drain hose 150 to external drain 148.

A spout 152 is configured for directing a flow of fluid into wash tub 124. For example, spout 152 may be in fluid communication with a water supply 154 (FIG. 2) in order to direct fluid (e.g., clean water or wash fluid) into wash tub 124. Spout 152 may also be in fluid communication with the sump 142. For example, pump assembly 144 may direct wash fluid disposed in sump 142 to spout 152 in order to circulate wash fluid in wash tub 124.

As illustrated in FIG. 3, a dispensing assembly or detergent drawer 156 is slidably mounted within front panel 130. Detergent drawer 156 receives a wash additive (e.g., detergent, fabric softener, bleach, or any other suitable liquid or powder) and directs the fluid additive to wash tub 124 during operation of washing machine appliance 100. According to the illustrated embodiment, detergent drawer 156 may also be fluidly coupled to spout 152 to facilitate the complete and accurate dispensing of wash additive.

In addition, a water supply valve 158 may provide a flow of water from a water supply source (such as a municipal water supply 154) into detergent dispenser 156 and into wash tub 124. In this manner, water supply valve 158 may generally be operable to supply water into detergent dispenser 156 to generate a wash fluid, e.g., for use in a wash cycle, or a flow of fresh water, e.g., for a rinse cycle. It should be appreciated that water supply valve 158 may be positioned at any other suitable location within cabinet 102. In addition, although water supply valve 158 is described herein as regulating the flow of “wash fluid,” it should be appreciated that this term includes, water, detergent, other additives, or some mixture thereof.

A control panel 160 including a plurality of input selectors 162 is coupled to front panel 130. Control panel 160 and input selectors 162 collectively form a user interface input for operator selection of machine cycles and features. For example, in one embodiment, a display 164 indicates selected features, a countdown timer, and/or other items of interest to machine users.

Operation of washing machine appliance 100 is controlled by a controller or processing device 166 (FIG. 1) that is operatively coupled to control panel 160 for user manipulation to select washing machine cycles and features. In response to user manipulation of control panel 160, controller 166 operates the various components of washing machine appliance 100 to execute selected machine cycles and features.

Controller 166 may include a memory and microprocessor, such as a general or special purpose microprocessor operable to execute programming instructions or micro-control code associated with a cleaning cycle. The memory may represent random access memory such as DRAM, or read only memory such as ROM or FLASH. In one embodiment, the processor executes programming instructions stored in memory. The memory may be a separate component from the processor or may be included onboard within the processor. Alternatively, controller 166 may be constructed without using a microprocessor, e.g., using a combination of discrete analog and/or digital logic circuitry (such as switches, amplifiers, integrators, comparators, flip-flops, AND gates, and the like) to perform control functionality instead of relying upon software. Control panel 160 and other components of washing machine appliance 100 may be in communication with controller 166 via one or more signal lines or shared communication busses.

During operation of washing machine appliance 100, laundry items are loaded into wash basket 120 through chamber opening 132, and washing operation is initiated through operator manipulation of input selectors 162. Wash tub 124 is filled with water, detergent, and/or other fluid additives, e.g., via spout 152 and or detergent drawer 156. One or more valves (e.g., water supply valve 158) can be controlled by washing machine appliance 100 to provide for filling wash basket 120 to the appropriate level for the amount of articles being washed and/or rinsed. By way of example for a wash mode, once wash basket 120 is properly filled with fluid, the contents of wash basket 120 can be agitated (e.g., with ribs 128) for washing of laundry items in wash basket 120.

After the agitation phase of the wash cycle is completed, wash tub 124 can be drained. Laundry articles can then be rinsed by again adding fluid to wash tub 124, depending on the particulars of the cleaning cycle selected by a user. Ribs 128 may again provide agitation within wash basket 120. One or more spin cycles may also be used. In particular, a spin cycle may be applied after the wash cycle and/or after the rinse cycle in order to wring wash fluid from the articles being washed. During a final spin cycle, basket 120 is rotated at relatively high speeds and drain pump assembly 144 may discharge wash fluid from sump 142. After articles disposed in wash basket 120 are cleaned, washed, and/or rinsed, the user can remove the articles from wash basket 120, e.g., by opening door 134 and reaching into wash basket 120 through chamber opening 132.

While described in the context of a specific embodiment of horizontal axis washing machine appliance 100, using the teachings disclosed herein it will be understood that horizontal axis washing machine appliance 100 is provided by way of example only. Other washing machine appliances having different configurations, different appearances, and/or different features may also be utilized with the present subject matter as well, e.g., vertical axis washing machine appliances.

Referring still to FIG. 1, a schematic diagram of an external communication system 170 will be described according to an exemplary embodiment of the present subject matter. In general, external communication system 170 is configured for permitting interaction, data transfer, and other communications between washing machine appliance 100 and one or more external devices. For example, this communication may be used to provide and receive operating parameters, user instructions or notifications, performance characteristics, user preferences, or any other suitable information for improved performance of washing machine appliance 100. In addition, it should be appreciated that external communication system 170 may be used to transfer data or other information to improve performance of one or more external devices or appliances and/or improve user interaction with such devices.

For example, external communication system 170 permits controller 166 of washing machine appliance 100 to communicate with a separate device external to washing machine appliance 100, referred to generally herein as an external device 172. As described in more detail below, these communications may be facilitated using a wired or wireless connection, such as via a network 174. In general, external device 172 may be any suitable device separate from washing machine appliance 100 that is configured to provide and/or receive communications, information, data, or commands from a user. In this regard, external device 172 may be, for example, a personal phone, a smartphone, a tablet, a laptop or personal computer, a wearable device, a smart home system, or another mobile or remote device.

In addition, a remote server 176 may be in communication with washing machine appliance 100 and/or external device 172 through network 174. In this regard, for example, remote server 176 may be a cloud-based server 176, and is thus located at a distant location, such as in a separate state, country, etc. According to an exemplary embodiment, external device 172 may communicate with a remote server 176 over network 174, such as the Internet, to transmit/receive data or information, provide user inputs, receive user notifications or instructions, interact with or control washing machine appliance 100, etc. In addition, external device 172 and remote server 176 may communicate with washing machine appliance 100 to communicate similar information.

In general, communication between washing machine appliance 100, external device 172, remote server 176, and/or other user devices or appliances may be carried using any type of wired or wireless connection and using any suitable type of communication network, non-limiting examples of which are provided below. For example, external device 172 may be in direct or indirect communication with washing machine appliance 100 through any suitable wired or wireless communication connections or interfaces, such as network 174. For example, network 174 may include one or more of a local area network (LAN), a wide area network (WAN), a personal area network (PAN), the Internet, a cellular network, any other suitable short- or long-range wireless networks, etc. In addition, communications may be transmitted using any suitable communications devices or protocols, such as via Wi-Fi®, Bluetooth®, Zigbee®, wireless radio, laser, infrared, Ethernet type devices and interfaces, etc. In addition, such communication may use a variety of communication protocols (e.g., TCP/IP, HTTP, SMTP, FTP), encodings or formats (e.g., HTML, XML), and/or protection schemes (e.g., VPN, secure HTTP, SSL).

External communication system 170 is described herein according to an exemplary embodiment of the present subject matter. However, it should be appreciated that the exemplary functions and configurations of external communication system 170 provided herein are used only as examples to facilitate description of aspects of the present subject matter. System configurations may vary, other communication devices may be used to communicate directly or indirectly with one or more associated appliances, other communication protocols and steps may be implemented, etc. These variations and modifications are contemplated as within the scope of the present subject matter.

Referring now also to FIGS. 4 through 8, a pressure sensing assembly 200 that may be used with washing machine appliance 100 will be described according to example embodiments of the present subject matter. In general, pressure sensing assembly 200 may be in fluid communication with sump 142 of wash tub 124 and may be configured for facilitating water level detection within washing machine appliance 100. In this regard, for example, pressure sensing assembly 200 may detect an air pressure within pressure sensing assembly 200. This air pressure may increase based on the water pressure which is a function of the level of wash fluid within wash tub 124. Although an exemplary pressure sensing assembly 200 is described below, it should be appreciated that variations and modifications may be made while remaining within the scope of the present subject matter.

As shown schematically in FIG. 3, pressure sensing assembly 200 may generally be positioned towards a bottom of wash tub 124, e.g., in direct fluid communication with sump 142. More specifically, according to the illustrated embodiment, wash tub 124 may define a sump opening 202 within sump 142 through which wash fluid may pass into pressure sensor assembly 200. In this manner, pressure sensing assembly 200 may provide real-time feedback regarding the pressure of wash fluid (and the associated water level) in wash tub 124.

According to the illustrated embodiment, pressure sensing assembly 200 includes a sensor housing 210 that is mounted directly to wash tub 124. In general, sensor housing 210 may define a fluid inlet 212 that is positioned over and fluidly coupled to sump opening 202. It should be appreciated that sensor housing 210 may include any suitable features for facilitating secure installation onto wash tub 124. For example, according to the illustrated embodiment, sensor housing 210 defines one or more keyed protrusions 214 that extend from sensor housing 210 for engaging complementary recesses (not shown) that are defined on wash tub 124. Notably, these keyed protrusions 214 may prevent rotation of sensor housing 210 relative to wash tub 214.

In addition, sensor housing 210 may define a plurality of mounting bosses 216 that are configured to receive mechanical fasteners (not shown) that may be used to secure pressure sensing assembly 200 to wash tub 124. For example, three mounting bosses 216 are illustrated, though the positioning of these mounting structures may vary while remaining within the scope of the present subject matter. In order to facilitate a fluid seal between sensor housing 210 and wash tub 124, pressure sensing assembly 200 may further include a gasket 218 positioned around fluid inlet 212 for creating a fluid seal between sensor housing 210 and wash tub 124. According to the illustrated embodiment, gasket 218 may be a resilient O-ring that is positioned around a sealing face 220 of sensor housing 210. However, it should be appreciated that other sealing mechanisms are possible and within the scope of the present subject matter.

Figure 7:
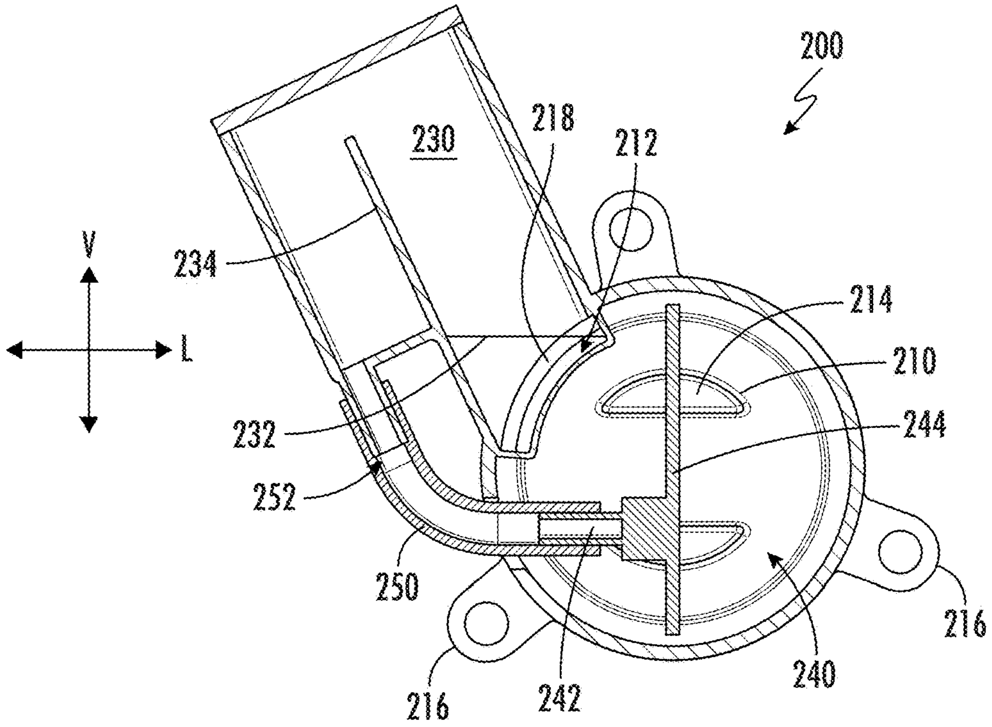
FIG. 7 provides a front, cross-sectional view of the example pressure sensing assembly of FIG. 4 according to an example embodiment of the present subject matter.
Figure 8:
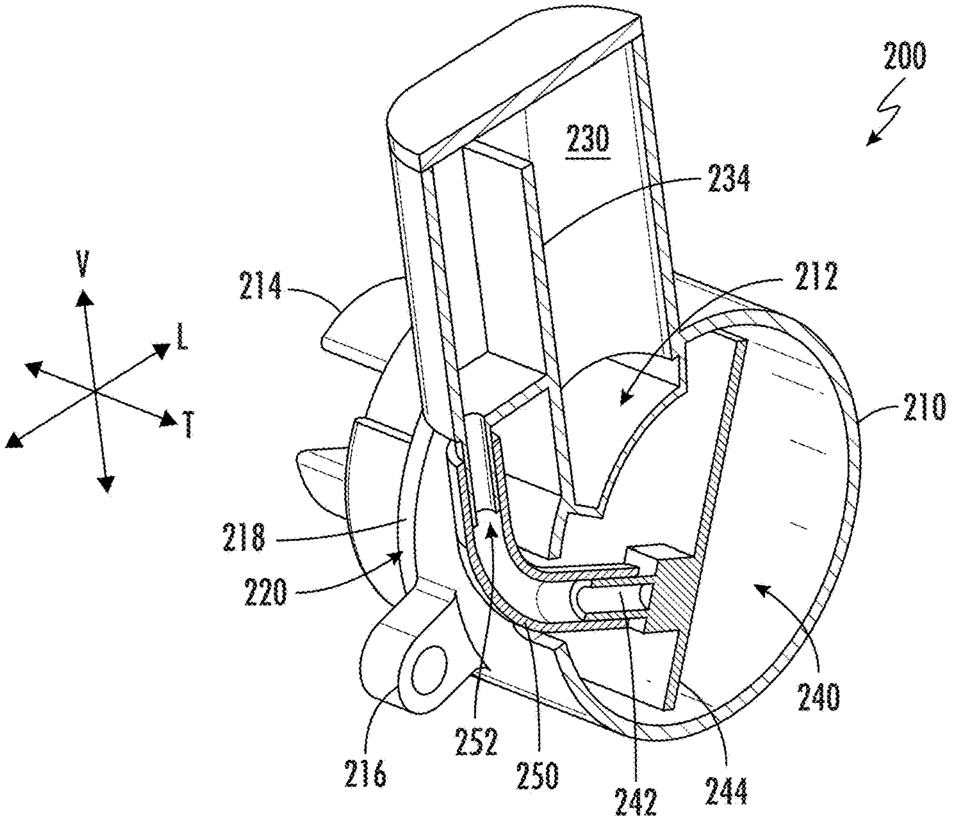
FIG. 8 provides a perspective, cross-sectional view of the example pressure sensing assembly of FIG. 4 according to an example embodiment of the present subject matter.

As best shown in FIGS. 7 and 8, sensor housing 210 may further define an air chamber 230 that is in fluid communication with fluid inlet 212. More specifically, according to the illustrated embodiment, air chamber 230 may be positioned above fluid inlet 212 along the vertical direction V. In this manner, as wash fluid fills the wash tub 124, the wash fluid may pass into sensor housing 210 through fluid inlet 212. However, once the wash fluid reaches a top of fluid inlet 212, the air pressure within air chamber 230 may prevent further rising of the water level. Accordingly, a maximum water level line is indicated generally by reference numeral 232 in FIG. 7. Notably, while the water level may remain relatively constant, the pressure within air chamber 230 may increase as the water level within wash tub 124 increases. As will be explained in more detail below, this air pressure may be communicated from pressure sensing assembly 200 to controller 166 to facilitate water level detection within washing machine appliance 100.

Referring still to FIGS. 7 and 8, sensor housing 210 may define a dividing wall 234 that is positioned within air chamber 230 and extends upward along the vertical direction V. In general, dividing wall 234 serves to prevent water from splashing out of air chamber 230. In addition, dividing wall 234 may help define a larger air chamber 230. It should be appreciated that the shape, size, and geometry of dividing wall 234 may vary while remaining within the scope of the present subject matter.

Sensor housing 210 may further define a sensing chamber 240 that is in fluid communication with air chamber 230. In addition, pressure sensing assembly 200 may include a pressure sensor 242 that is mounted within sensing chamber 240 for detecting an air pressure of air chamber 230. In this regard, pressure sensor 242 may be any suitable device for measuring air pressure. For example, pressure sensor 242 may be a piezoelectric pressure sensor and thus may include an elastically deformable plate and a piezoresistor mounted on the elastically deformable plate. Other suitable pressure sensors are possible and within the scope of the present subject matter.

According to example embodiments, sensing chamber 240 may be an extension of air chamber 230 or may be a separate chamber positioned elsewhere on sensor housing 210. For example, according to the illustrated embodiment, sensing chamber 240 is positioned below air chamber 230 and at least partially below (and fluidly isolated from) fluid inlet 212. Notably, this positioning of sensing chamber 240 may provide a compact sensing assembly and prevent the need for providing long conduits for fluid communication between air chamber 230 and sensing chamber 240. In addition, pressure sensor 242 may be mounted directly to sensor housing 210 to minimize undesirable vibrations and erroneous measurements.

Specifically, according to the illustrated embodiment, pressure sensing assembly 200 may further include a printed circuit board 244 positioned within sensing chamber 240 and a pressure sensor 242 may be mounted directly to printed circuit board 244. Printed circuit board 244 may obtain air pressure measurements from pressure sensor 242 and transmit them directly to controller 166 to facilitate appliance operation. For example, printed circuit board 244 may be in wired or wireless communication with controller 166. Notably, even in a wired embodiment, the routing of an electrical wire is much easier and introduces much less noise than the routing of a fluid conduit as in conventional constructions.

As shown generally in FIGS. 4 through 8, pressure sensing assembly 200 may further include a tube 250 that provides fluid communication between air chamber 230 and pressure sensor 242. In this regard, for example, tube 250 may be a short conduit or pipe that connects to an air port 252 defined at the bottom of air chamber 230 opposite dividing wall 234 relative to fluid inlet 212. Tube 250 may pass down and into sensing chamber 240 where it may be directly connected to pressure sensor 242. Notably, this configuration may result in a very short length of tube 250, resulting in consistent and accurate measurements. For example, according to the illustrated embodiment, a length of tube 250 is less than a height of air chamber 230. In addition, the routing of air chamber 230 and tube 250 may ensure that no liquid enters to 250 and reaches pressure sensor 242.

It should be appreciated that various features of pressure sensing assembly 200 and sensor housing 210 may be formed from any suitably rigid material. For example, according to exemplary embodiments, sensor housing may be formed by injection molding, e.g., using a suitable plastic material, such as injection molding grade Polybutylene Terephthalate (PBT), Nylon 6, high impact polystyrene (HIPS), acrylonitrile butadiene styrene (ABS), or any other suitable blend of polymers. Alternatively, according to the exemplary embodiment, these components may be compression molded, e.g., using sheet molding compound (SMC) thermoset plastic or other thermoplastics. According to still other embodiments, portions of sensor housing 210 may be formed from any other suitable rigid material. Specifically, sensor housing 210 may be injection molded as a single, integral piece that defines all of fluid inlet 212, air chamber 230, dividing wall 234, and sensing chamber 240.

As explained herein, aspects of the present subject matter are generally directed to a system and method of determining the amount of water in a front-load washing machine using an air chamber and a pressure sensor. The pressure sensor may be integrated into an air chamber. The air chamber may be mounted to the lower portion of the tub, with an opening between the sump area of the tub and the air chamber to allow water to enter the air chamber portion of the device. The device may be sealed to outside pressure, so once the water level in the tub reaches the top of the opening between the tub sump area and the air chamber, the water ceases to enter the air chamber. As water rises in the tub, air pressure increases in the air chamber and a tube connects the air chamber to the onboard pressure sensor. This pressure sensing assembly provides proximity between the pressure sensor and the air chamber, resulting in a very short hose is utilized to connect the two. This may result in the ability to avoid routing a long hose, and the associated cost of the mounting hardware required to do so. This also greatly reduces the risk of the hose being damaged or kinking, which would result in the failure of the pressure sensing system.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A washing machine appliance comprising:

a wash tub positioned within a cabinet and defining a wash chamber and a sump;

a wash basket rotatably mounted within the wash tub for receiving a load of clothes;

a dispensing assembly mounted within the cabinet for selectively adding wash fluid into the wash tub; and a pressure sensing assembly in fluid communication with the sump of the wash tub, the pressure sensing assembly comprising:

a sensor housing mounted to the wash tub, the sensor housing defining a fluid inlet in fluid communication with the sump, an air chamber positioned above the fluid inlet along a vertical direction and being in fluid communication with the fluid inlet, and a sensing chamber in fluid communication with the air chamber, wherein the sensor housing defines a dividing wall that extends upward along the vertical direction within the air chamber; and a pressure sensor mounted within the sensing chamber for detecting an air pressure of the air chamber.

2. The washing machine appliance of claim 1, wherein the wash tub defines a sump opening within the sump, and wherein the sensor housing is mounted such that the fluid inlet is positioned over the sump opening.

3. The washing machine appliance of claim 1, wherein the sensor housing defines a keyed protrusion for engaging a complementary recess defined on the wash tub.

4. The washing machine appliance of claim 1, wherein the pressure sensing assembly further comprising:

a gasket positioned around the fluid inlet for creating a fluid seal between the sensor housing and the wash tub.

5. The washing machine appliance of claim 1, wherein the pressure sensor is mounted directly to the sensor housing.

6. The washing machine appliance of claim 5, wherein the pressure sensing assembly further comprises:

a printed circuit board positioned within the sensing chamber, wherein the pressure sensor is mounted to the printed circuit board.

7. The washing machine appliance of claim 5, wherein the pressure sensing assembly further comprises:

a tube that provides fluid communication between the air chamber and the pressure sensor.

8. The washing machine appliance of claim 7, wherein a length of the tube is less than a height of the air chamber.

9. The washing machine appliance of claim 1, wherein the sensing chamber is positioned below the air chamber.

10. The washing machine appliance of claim 1, wherein the pressure sensing assembly further comprises:

a plurality of mounting bosses for receiving mechanical fasteners.

11. The washing machine appliance of claim 1, wherein the sensor housing is injection molded as a single, integral piece.

12. The washing machine appliance of claim 1, wherein the washing machine appliance is a front load washing machine appliance.

13. A pressure sensing assembly for a washing machine appliance, the washing machine appliance comprising a wash tub defining a sump and a sump opening within the sump, the pressure sensing assembly comprising:

a sensor housing mounted to the wash tub, the sensor housing defining a fluid inlet in fluid communication with the sump, an air chamber in fluid communication with the fluid inlet, and a sensing chamber in fluid communication with the air chamber, wherein the sensor housing is mounted such that the fluid inlet is positioned over the sump opening, and wherein the sensor housing defines a keyed protrusion for engaging a complementary recess defined on the wash tub; and a pressure sensor mounted within the sensing chamber for detecting an air pressure of the air chamber.

14. The pressure sensing assembly of claim 13, wherein the air chamber is positioned above the fluid inlet along a vertical direction and the sensor housing defines a dividing wall that extends upward along the vertical direction within the air chamber.

15. The pressure sensing assembly of claim 13, wherein the pressure sensor is mounted directly to the sensor housing.

16. The pressure sensing assembly of claim 15, wherein the pressure sensing assembly further comprises:

a tube that provides fluid communication between the air chamber and the pressure sensor.

17. The pressure sensing assembly of claim 16, wherein the sensing chamber is positioned below the air chamber and a length of the tube is less than a height of the air chamber.

18. A washing machine appliance comprising:

a wash tub positioned within a cabinet and defining a wash chamber and a sump;

a wash basket rotatably mounted within the wash tub for receiving a load of clothes;

a dispensing assembly mounted within the cabinet for selectively adding wash fluid into the wash tub; and a pressure sensing assembly in fluid communication with the sump of the wash tub, the pressure sensing assembly comprising:

a sensor housing mounted to the wash tub, the sensor housing defining a fluid inlet in fluid communication with the sump, an air chamber in fluid communication with the fluid inlet, and a sensing chamber in fluid communication with the air chamber, wherein the sensing chamber is positioned below the air chamber; and a pressure sensor mounted within the sensing chamber for detecting an air pressure of the air chamber.

19. The washing machine appliance of claim 18, wherein the wash tub defines a sump opening within the sump, and wherein the sensor housing is mounted such that the fluid inlet is positioned over the sump opening.

20. The washing machine appliance of claim 18, wherein the sensor housing defines a keyed protrusion for engaging a complementary recess defined on the wash tub.

* * * * *